United States Patent
Engelkemier et al.

(10) Patent No.: US 11,663,078 B1
(45) Date of Patent: May 30, 2023

(54) IN-SERVICE SCANNING AND CORRECTION OF STORED DATA FOR ACHIEVING FUNCTIONAL SAFETY

(71) Applicant: Ethernovia Inc., San Jose, CA (US)

(72) Inventors: Darren S. Engelkemier, Menlo Park, CA (US); Tom Quoc Wellbaum, San Jose, CA (US); Roy T. Myers, Jr., Morgan City, CA (US); Hossein Sedarat, San Jose, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

(21) Appl. No.: 17/451,049

(22) Filed: Oct. 15, 2021

Related U.S. Application Data

(60) Provisional application No. 63/092,246, filed on Oct. 15, 2020.

(51) Int. Cl.
  *G06F 11/00* (2006.01)
  *G06F 11/10* (2006.01)
  *G06F 11/07* (2006.01)
  *G06F 3/06* (2006.01)

(52) U.S. Cl.
  CPC ........ *G06F 11/1068* (2013.01); *G06F 3/0619* (2013.01); *G06F 3/0659* (2013.01); *G06F 3/0679* (2013.01); *G06F 11/076* (2013.01); *G06F 11/0772* (2013.01)

(58) Field of Classification Search
  None
  See application file for complete search history.

(56) References Cited

U.S. PATENT DOCUMENTS

| | | | |
|---|---|---|---|
| 4,967,347 A | 10/1990 | Smith et al. | |
| 10,810,079 B2* | 10/2020 | Halbert | ............... G06F 11/1048 |
| 2005/0106713 A1 | 5/2005 | Phan et al. | |
| 2014/0013182 A1* | 1/2014 | Cheng | ............... H03M 13/2906 |
| | | | 714/758 |
| 2015/0332463 A1 | 11/2015 | Galera et al. | |
| 2017/0139761 A1* | 5/2017 | Song | ....................... G06F 12/02 |
| 2017/0272102 A1* | 9/2017 | Goldenberg | ...... H03M 13/3723 |

(Continued)

FOREIGN PATENT DOCUMENTS

| CN | 107085648 | 8/2017 |
|---|---|---|
| WO | 2019142484 | 7/2019 |

OTHER PUBLICATIONS

US 2022/0035363 A1, 02/2022, Engelkemier et al. (withdrawn)
(Continued)

*Primary Examiner* — Daniel F. McMahon
(74) *Attorney, Agent, or Firm* — Schwegman Lundberg & Woessner, P.A.

(57) ABSTRACT

Various embodiments described herein provide for in-service scanning and correction of stored data for achieving functional safety. For some embodiments, a data scanning and correction system periodically reads data from different portions (e.g., addresses) of a storage device (e.g., memory) implemented with ECC to detect any errors in the data. If an error is detected, the data scanning and correction system generates corrected data and rewrites the corrected data to the portion of the storage device. The data scanning and correction system may continuously cycle this process through different portions of the storage device to detect and correct errors while the storage device is in-service.

21 Claims, 7 Drawing Sheets

(56) References Cited

U.S. PATENT DOCUMENTS

| | | | |
|---|---|---|---|
| 2018/0322008 A1* | 11/2018 | Chung | G06F 11/1068 |
| 2020/0004627 A1* | 1/2020 | Sharon | G06F 3/064 |
| 2020/0043256 A1 | 2/2020 | Rocci et al. | |
| 2020/0364958 A1 | 11/2020 | Lewis et al. | |
| 2021/0049068 A1* | 2/2021 | Schaefer | G06F 11/1076 |

OTHER PUBLICATIONS

S.-H. Lim, J.-B. Lee, G.-M. Kim and W. H. Ahn, "A Stepwise Rate-Compatible LDPC and Parity Management in NAND Flash Memory-Based Storage Devices," in IEEE Access, vol. 8, pp. 162491-162506, 2020, doi: 10.1109/ACCESS.2020.3021498. (Year: 2020).*

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, doi: 10.1109/JPROC.2017.2713127. (Year: 2017).*

"U.S. Appl. No. 17/132,556, Non Final Office Action dated Jun. 16, 2022", 11 pgs.

"U.S. Appl. No. 17/451,051, Non Final Office Action dated Sep. 1, 2022", 10 pgs.

"U.S. Appl. No. 17/132,556, Response filed Sep. 16, 22 to Non Final Office Action dated Jun. 16, 2022", 11 pgs.

"U.S. Appl. No. 17/451,051, Response filed Nov. 29, 2022 to Non Final Office Action dated Sep. 1, 2022", 11 pgs.

U.S. Appl. No. 17/132,556, filed Dec. 23, 5187.024US1 Recursive System Layer 2020 Analysis for Achieving.

U.S. Appl. No. 17/451,046, filed Oct. 15, 2021 5187.024US2 Efficient Safety Mechanism Selection for Achieving.

U.S. Appl. No. 17/451,048, filed Oct. 15, 2021 5187.024US3 Determining Diagnostic Coverage for Achieving.

U.S. Appl. No. 17/451,051, filed Oct. 15, 2021 5187.024US5 Redundant Segment for.

"U.S. Appl. No. 17/132,556, Notice of Allowance dated Dec. 21, 2022", 8 pgs.

"U.S. Appl. No. 17/132,556, Corrected Notice of Allowability dated Jan. 5, 2023", 2 pgs.

* cited by examiner

… (US 11,663,078 B1)

IN-SERVICE SCANNING AND CORRECTION OF STORED DATA FOR ACHIEVING FUNCTIONAL SAFETY

CROSS-REFERENCE TO RELATED APPLICATIONS

The present application claims the benefit of priority of U.S. Provisional Application No. 63/092,246, filed on Oct. 15, 2020, which is incorporated herein by reference in its entirety.

TECHNICAL FIELD

An embodiment of the present subject matter relates generally to functional safety, and more specifically, to in-service scanning and correction of stored data for achieving functional safety.

BACKGROUND

Safety-critical automotive applications have stringent demands for functional safety and reliability. The International Organization for Standardization (ISO) has established an international standard known as ISO 26262 "Road vehicles—Functional safety." Although ISO 26262 is titled "Road vehicles—Functional safety," it relates to the functional safety of the electrical and electronic systems within vehicles, including the systems as a whole.

ISO 26262 defines four Automotive Safety Integrity Levels (ASILs), spanning from a least stringent safety level defined as ASIL-A to a most stringent safety level defined as ASIL-D. Each ASIL defines a level of safety mechanisms that are required for avoiding an unreasonable residual risk. For example, ASIL-B requires that 90% of faults that can propagate and cause a system failure be detected, whereas the more stringent safety level of ASIL-D requires that 99% of these faults be detected. ASIL-D is targeted for mission critical applications, such as Integrated Circuits (ICs) used for braking, steering, or autonomous driving, that could cause life-threatening to fatal injuries if a failure occurred.

Error Correction Code (ECC) is one type of safety measure that is used to help achieve functional safety goals. For example, ECC can be used to detect and potentially correct data corruption within a storage device. The extent to which ECC can detect and correct corrupted data is limited based on the type of ECC and the ratio of ECC bits to data bits covered that is used. For example, a common type of ECC is a hamming code that provides for two bits of error detection and one bit of error correction. While ECC can provide for error correction up to a certain number of bits, data corruption beyond that point cannot be corrected. Accordingly, improvements are needed.

BRIEF DESCRIPTION OF THE DRAWINGS

Various ones of the appended drawings merely illustrate example embodiments of the present disclosure and cannot be considered as limiting its scope.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Disclosed are systems, methods, and non-transitory computer-readable media for in-service scanning and correction of stored data for achieving functional safety. A data scanning and correction system provides for in-service scanning and correction of data using ECC. For example, the data scanning and correction system periodically reads data from different portions (e.g., addresses) of a storage device (e.g., memory) and uses ECC to detect any errors in the read data. If an error is detected, the data scanning and correction system generates corrected data using the ECC and rewrites the corrected data to the portion of the storage device. The data scanning and correction system may continuously cycle this process through different portions of the storage device to detect and correct errors while the storage device is in-service. That is, the data scanning and correction system may continuously perform this process separately to proactively correct corrupted data. Correcting detected errors in this manner reduces the likelihood that the number of bits that become corrupted at a portion of a storage device would surpass the number of bits that can be corrected using the implemented ECC. This increases the effectiveness of the ECC at providing functional safety.

To provide for additional functionality safety, ECC may be extended to cover both the storage addresses and data fields stored by the storage device. Current systems limit the use of ECC to just data fields and do not extend this safety mechanisms to storage addresses. Implementing ECC to cover the storage addresses further increases the functional safety level provided by use of ECC.

In some embodiments, the safety mechanisms implemented within a particular application may be tested at startup and/or reset to ensure that the safety mechanisms are operating correctly. For example, predetermined errors may be implemented at startup to test whether the safety mechanisms were able to identify the errors.

Figure 1:
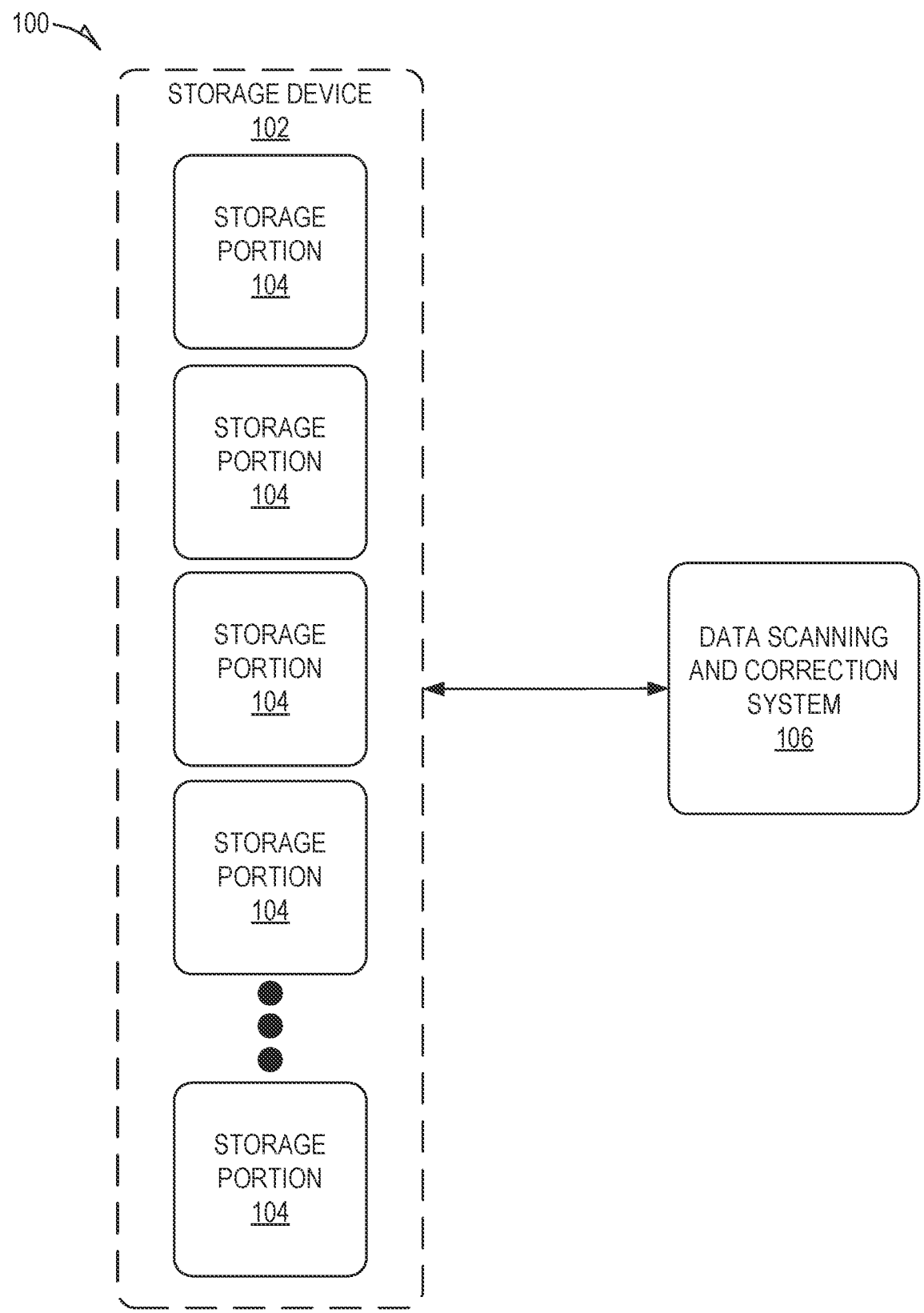
FIG. 1 is a block diagram of a system for in-service scanning and correction of stored data for achieving functional safety, according to certain example embodiments.

FIG. 1 is block diagram of a system 100 for in-service scanning and correction of stored data for achieving functional safety, according to certain example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 1. However, a skilled artisan will readily recognize that various additional functional components may be supported by the system 100 to facilitate additional functionality that is not specifically described herein.

As shown, the system includes a storage device 102 in communication with a data scanning and correction system 106. The storage device 102 may be any of a variety of types of element on a semiconductor that stores electronic data. For example, a storage device 102 may be any type of volatile or non-volatile memory, such as a Static Random Access Memory (SRAM), Dynamic Random Access Memory (DRAM), Register Files (Regfiles), Ternary Content-Addressable Memory (TCAM), First-in First-outs (FIFOs), Last-in Last-outs (LIFOs), configuration registers, registers, Read only Memory (ROM), linked lists, and the like.

As shown, a storage device 102 may include multiple storage portions 104. Each storage portion 104 includes a portion of the storage device 102 at which data may be stored. For example, each storage portion 104 may be associated with a unique set of one or more storage addresses.

Data stored on the storage device 102 may degrade over time. For example, individual bits in the data may become flipped (e.g., bit decay) due to various factors, such as electric charge, electromagnetic radiation, and the like. The storage device 102 may incorporate ECC to allow for data corruption within the storage device 102 to be detected and potentially corrected. ECC functions through use of additional parity bits that are added to the stored data. These parity bits may be used to perform a mathematical algorithm to determine whether any errors (e.g., flipped bits) exist in the data and potentially reconstruct the original data.

The extent to which ECC can be used to detect and correct corrupt data is limited based on the type of ECC that is used. For example, a common type of ECC is a hamming code that provides for two bits of error detection and one bit of error correction. This means that the hamming code can be used to determine whether the data has either no error, an error to a single bit, or an error in two or more bits, and that data with a single bit error can be reconstructed. Other ECCs may provide a higher or lower number of bit error detection and/or bit error correction. In any case, the number of bits that can be corrected is limited by the ECC. This can become problematic over time as the data stored in the storage device 102 continues to degrade (e.g., additional bits begin to flip) because the number of bit errors may exceed the maximum number that is correctable by the ECC. Accordingly, the ability of the ECC to provide functional safety may decrease.

To alleviate this issue, the data scanning and correction system 106 provides for in-service scanning and correction of data stored in the storage device. For example, the data scanning and correction system 106 periodically reads data from each different storage portion 104 (e.g., address) of the storage device and uses ECC to detect any errors in the read data. If an error is detected, the data scanning and correction system 106 generates corrected data using the ECC and rewrites the corrected data to the storage portion 104 from which the data was read. As a result, the data that included the error is replaced with the reconstructed data generated using the ECC.

The data scanning and correction system 106 may continuously cycle this process through different storage portions 104 of the storage device 102 to detect and correct errors while the storage device 102 is in-service. The data scanning and correction system 106 performs this cycle separately from normal operations of the application in which the storage device 102 is implemented. That is, the read requests initiated by the data scanning and correction system 106 are performed for the purpose of correcting corrupted data rather than accessing the data as part of performing other operations.

Correcting detected errors in this manner proactively corrects corrupted data, thereby reducing the likelihood that the number of bits that become corrupted at a storage portion 104 will surpass the number of bits that can be corrected using the implemented ECC. This increases the effectiveness of the ECC at providing functional safety.

The data scanning and correction system 106 may be comprised of one or more computing devices. For example, the data scanning and correction system 106 may be implemented using any of a variety of types of computing devices, such as computing devices including some or all of the features, components, and peripherals of the machine 700 shown in FIG. 7.

The system 100 may be implemented into a variety of types of applications and the data scanning and correction system 106 may provide in-service scanning and correction of the data stored in the storage device 102 during use of the application. For example, the system 100 may be implemented within an automotive application (e.g., within computing devices of a vehicle) and the data scanning and correction system 106 may provide in-service scanning and correction of the data stored in the storage device 102 during operation of the vehicle.

While the system 100 is shown as having only one storage device 102 and one data scanning and correction system 106, this is only one example and is not meant to be limiting. A system may incorporate any number of storage devices 102 and/or data scanning and correction systems 106. Further, each storage device 102 may be comprised of any number of storage portions 104, which may be scanned by a data scanning and correction system 106 to provide in-service scanning and correction of the data stored in the storage device 102.

In some embodiments, the ECC implemented within the storage device 102 may be extended to cover both the storages addresses and data fields stored by the storage device 102 to provide for additional functionality safety. Currently, use of ECC is limited to just data fields and is not extended for use as providing functional safety to storage addresses. Implementing ECC to cover the storage addresses further increases the functional safety level provided by use of ECC to the data stored within the storage device 102.

In some embodiments, the data scanning and correction system 106 may provide for testing of the safety mechanisms implemented within a particular application. For example, the data scanning and correction system 106 may test the safety mechanisms at startup and/or reset to ensure that the safety mechanisms are operating correctly. For example, the data scanning and correction system 106 may provide for predetermined errors to be implemented at startup to test whether the safety mechanisms were able to identify and clear the errors.

Figure 2:
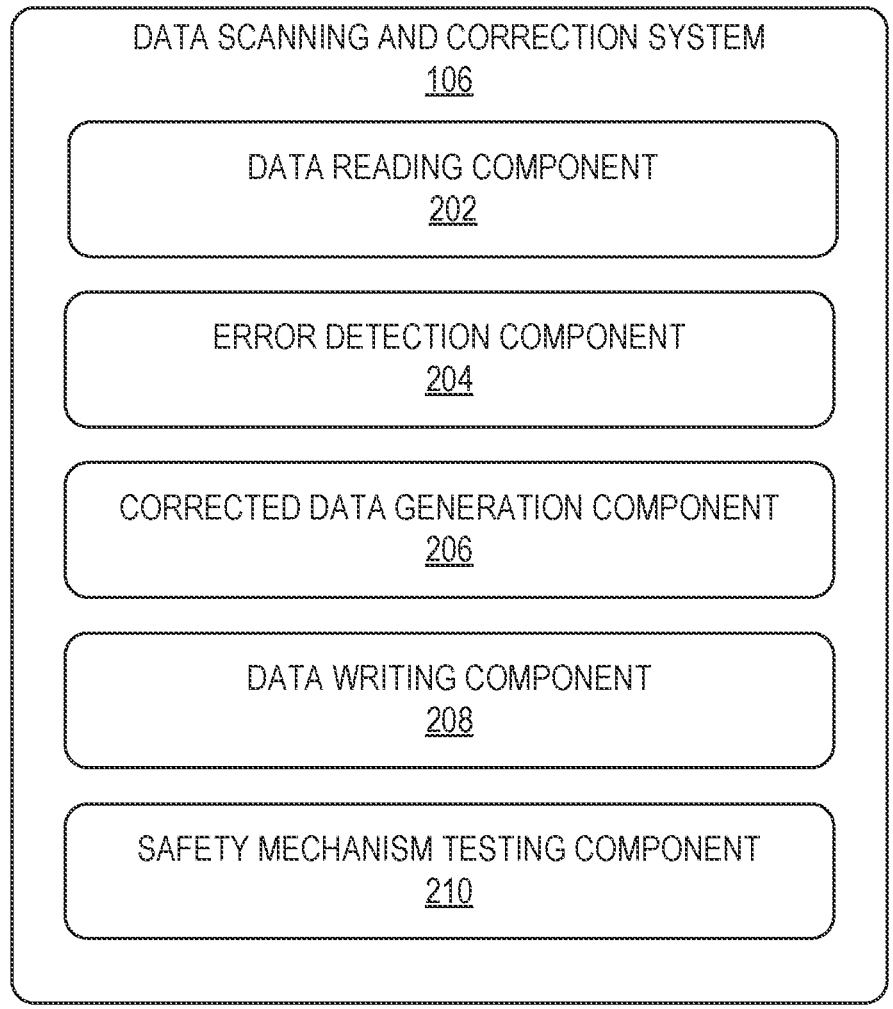
FIG. 2 is a block diagram of a data scanning and correction system, according to some example embodiments.

FIG. 2 is a block diagram of a data scanning and correction system 106, according to some example embodiments. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a skilled artisan will readily recognize that various additional functional components may be supported by the data scanning and correction system 106 to facilitate additional functionality that is not specifically described herein. To avoid obscuring the inventive subject matter with unnecessary detail, various functional components (e.g., modules, mechanisms, devices, nodes, etc.) that are not germane to conveying an understanding of the inventive subject matter have been omitted from FIG. 2. However, a skilled artisan will readily recognize that various additional functional components may be supported by the data scanning and correction system 106 to facilitate additional functionality that is not specifically described herein.

As shown, the data scanning and correction system 106 includes a data reading component 202, an error detection component 204, a corrected data generation component 206, a data writing component 208, and a safety mechanism testing component 210.

The data reading component 202 reads data from the storage device 102. For example, the data reading component 202 performs a read request to access the data stored at a storage portion 104 (e.g., an address or set of addresses) of the storage device 102. The data read from the storage device 102 may include a storage addresses and/or data fields. The data may also include additional bits added to the data to provide for error detection and correction using an ECC.

The data reading component 202 may provide the data read from the storage device 102 to the other components of the data scanning and correction system 106 to provide in-service scanning and correction of the data stored in the storage device 102. The data reading component 202 may read data from the various storage portions 104 of the storage device 102 according to a predetermined schedule. For example, the predetermined schedule may identify an order in which the data reading component 202 reads data from the storage portions 104. The predetermined schedule may also indicate a timing for repeating the process of reading data from the various storage portions 104. This allows for the data reading component 202 to continuously cycle through the different storage portions 104 of the storage device 102 to provide for in-service scanning and correction of the data stored in the storage device 102.

The error detection component 204 uses the data read by the data reading component 202 to determine whether there is an error in the read data. For example, the error detection component 204 may use the parity bits included in the data along with the ECC to determine whether an error (e.g., flipped bits) is present in the data. In the event that a correctable error is present in the data, the error detection component 204 notifies the corrected data generation component 206 of the error.

The corrected data generation component 206 generates corrected data based on the ECC and data read by the data reading component 202. For example, the corrected data generation component 206 may reconstruct the data to correct any flipped bits in the data.

The data writing component 208 writes the corrected data back to the storage portion 104 from which the data was read. As a result, the degraded data that was stored at the storage portion 104 is rewritten with corrected data. Correcting detected errors in this manner reduces the likelihood that the number of bits that become corrupted at a storage portion 104 will surpass the number of bits that can be corrected using the implemented ECC. This increases the effectiveness of the ECC at providing functional safety.

In some embodiments, the corrected data generation component 206 generates the corrected data regardless of whether an error is detected in the data and the data writing component 208 writes the corrected data back to the storage portion 104 from which it was read. Always generating and writing back corrected data accounts for potentially flipped bits due to leakage.

As explained earlier, the number of bits that can be corrected using ECC is limited to a threshold number. In the event that the number of flipped bits in the data exceeds the threshold, the data scanning and correction system 106 may cause presentation of a notification or alert. For example, the notification may include data identifying the storage address associated with the data. In some embodiments, the data scanning and correction system 106 may rewrite the corrupted data from a shadow copy of the data, if available.

The safety mechanism testing component 210 provides for testing of the safety mechanisms implemented within a particular application. For example, the safety mechanism testing component 210 may test the safety mechanisms at startup and/or reset to ensure that the safety mechanisms are operating correctly. The safety mechanism testing component 210 may provide for predetermined errors to be implemented at startup to test whether the safety mechanisms were able to identify and clear the errors.

Figure 3:
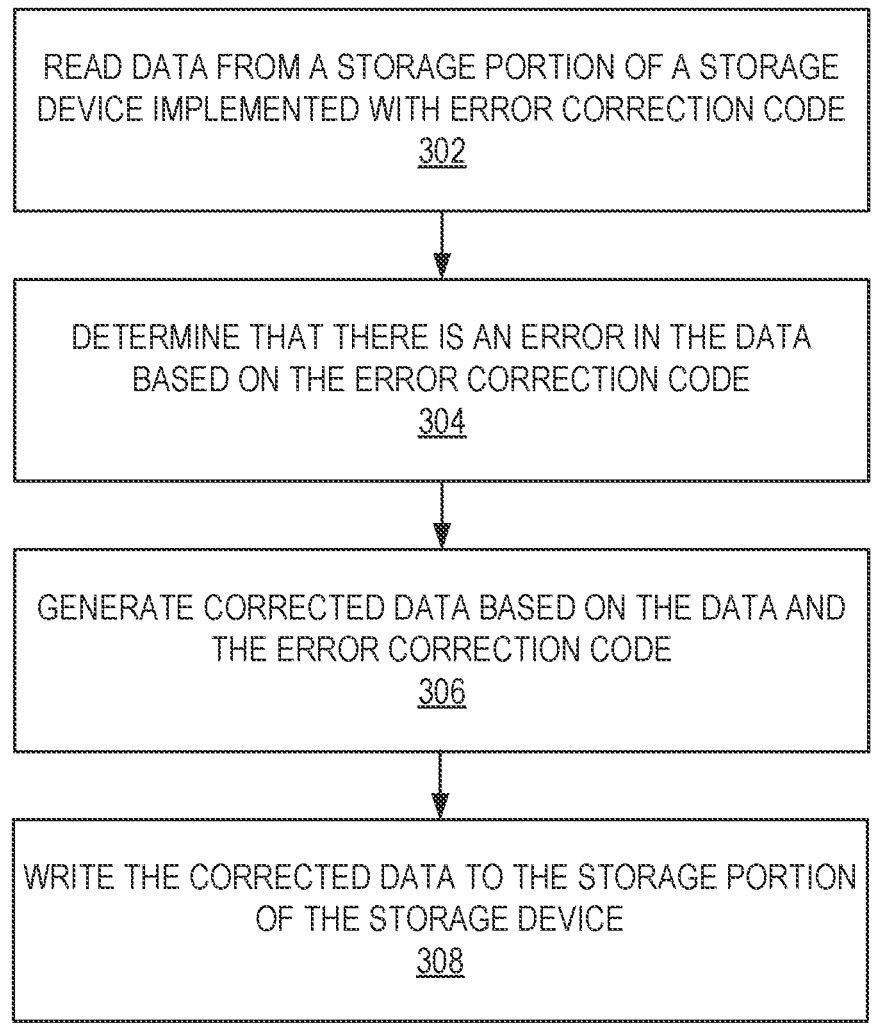
FIG. 3 is a flowchart showing a method for in-service scanning and correction of stored data at a portion of a storage element, according to some example embodiments.

FIG. 3 is a flowchart showing a method 300 for in-service scanning and correction of stored data at a portion of a storage element, according to some example embodiments. The method 300 may be embodied in computer readable instructions for execution by one or more processors such that the operations of the method 300 may be performed in part or in whole by the data scanning and correction system 106; accordingly, the method 300 is described below by way of example with reference to the data scanning and correction system 106. However, it shall be appreciated that at least some of the operations of the method 300 may be deployed on various other hardware and/or software configurations and the method 300 is not intended to be limited to the data scanning and correction system 106.

At operation 302, the data reading component 202 reads data from a storage portion 104 of a storage device 102 implemented with ECC. For example, the data reading component 202 performs a read request to access the data stored at the storage portion 104 (e.g., an address, set of addresses, pointer(s)) of the storage device 102. The data read from the storage device 102 may include a storage addresses and/or data fields. The data may also include additional bits added to the data to provide for error detection and correction using an ECC.

The data reading component 202 may provide the data read from the storage portion 104 to the other components of the data scanning and correction system 106 to provide in-service scanning and correction of the data.

At operation 304, the error detection component 204 determines that there is an error in the data based on the ECC. The error detection component 204 uses the data read by the data reading component 202 to determine whether there is an error in the read data. For example, the error detection component 204 may use the parity bits included in the data along with the ECC to determine whether an error (e.g., flipped bits) is present in the data. In the event that a correctable error is present in the data, the error detection component 204 notifies the corrected data generation component 206 of the error.

At operation 306, the corrected data generation component 206 generates corrected data based on the data and the ECC. For example, the corrected data generation component 206 may reconstruct the data to correct any flipped bits in the data.

At operation 308, the data writing component 208 writes the corrected data to the storage portion 104 of the storage device 102. The data writing component 208 writes the corrected data back to the storage portion 104 from which the data was read. As a result, the degraded data that was stored at the storage portion 104 is rewritten with corrected data. Correcting detected errors in this manner reduces the likelihood that the number of bits that become corrupted at a storage portion 104 will surpass the number of bits that can be corrected using the implemented ECC. This increases the effectiveness of the ECC at providing functional safety.

Figure 4:
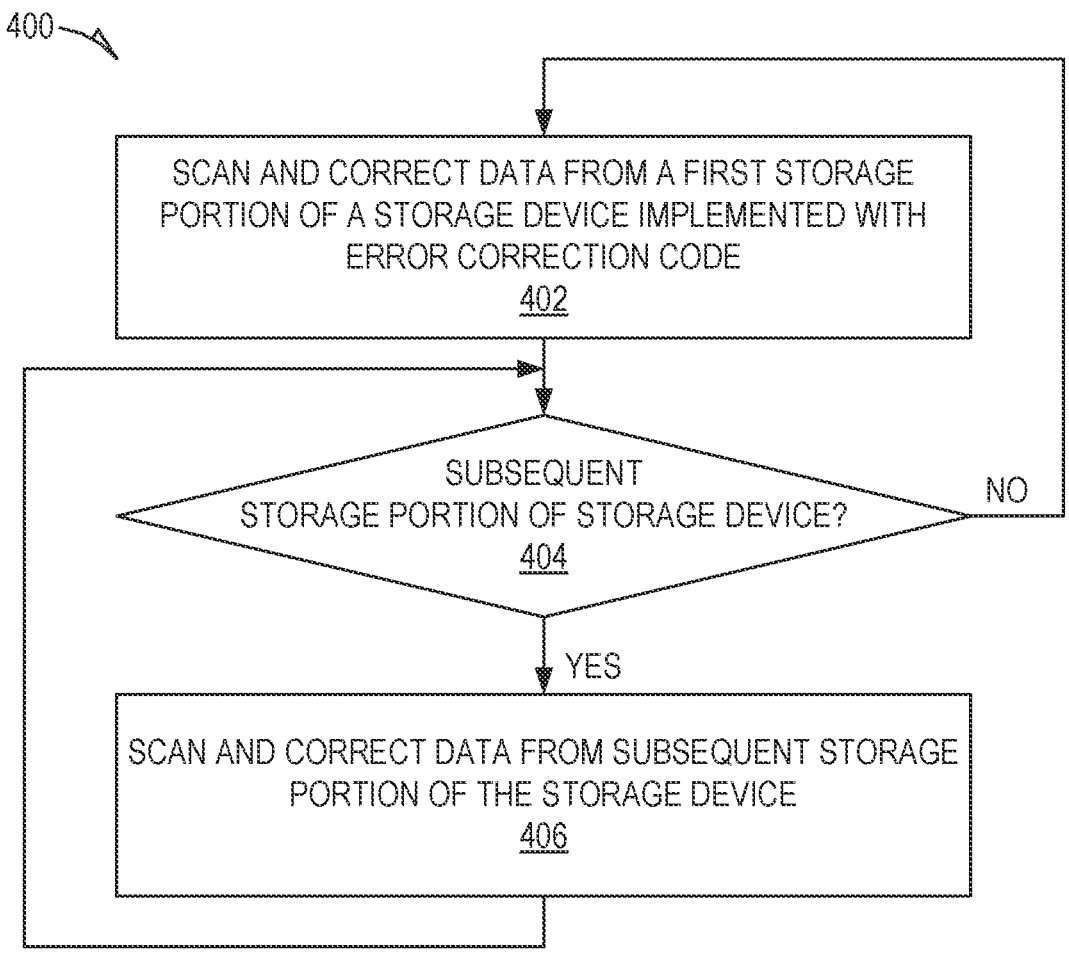
FIG. 4 is a flowchart showing a method for in-service scanning and correction of stored data for achieving functional safety in storage devices, according to some example embodiments.

FIG. 4 is a flowchart showing a method 400 for in-service scanning and correction of stored data for achieving functional safety in storage devices 102, according to some example embodiments. The method 400 may be embodied in computer readable instructions for execution by one or more processors such that the operations of the method 400 may be performed in part or in whole by the data scanning and correction system 106; accordingly, the method 400 is described below by way of example with reference to the data scanning and correction system 106. However, it shall be appreciated that at least some of the operations of the method 400 may be deployed on various other hardware and/or software configurations and the method 400 is not intended to be limited to the data scanning and correction system 106.

At operation 402, the data scanning and correction system 106 scans and corrects data from a first storage portion 104 of a storage device 102 implemented with ECC. For example, the data scanning and correction system 106 may implement the method 300 shown in FIG. 3. The first storage portion 104 of the storage device 102 may be defined by a predetermined order established for use by the data scanning and correction system 106. For example, the predetermined order may define a sequential order in which the data scanning and correction system 106 is to read data and potentially correct data from each storage portion 104 of the storage device 102.

At operation 402, the data scanning and correction system 106 determines whether there is a subsequent storage portion 104 of the storage device 102. For example, the data scanning and correction system 106 may determine if the there is a subsequent storage portion 104 in the sequential order identified in the predetermined order or if the previously scanned storage portion 104 was the last storage portion 104 in the sequential order. If the data scanning and correction system 106 determines that there is a subsequent storage portion 104, at operation 406 the data scanning and correction system 106 scans and corrects data from the subsequent storage portion 104 of the storage device 102. The method 400 then returns to operation 404.

Alternatively, if at operation 404 the data scanning and correction system 106 determines that there is no subsequent storage portion 104 of the storage device 102 (e.g., the previously scanned storage portion 104 was the last storage portion 104 in the sequential order), the method 400 may return to operation 402 where the data scanning and correction system 106 scans and corrects data from the first storage portion 104 of the storage device 102. The method 400 shown in FIG. 4 provides for continuous in-service scanning and correction of the data stored in the storage device 102.

Figure 5:
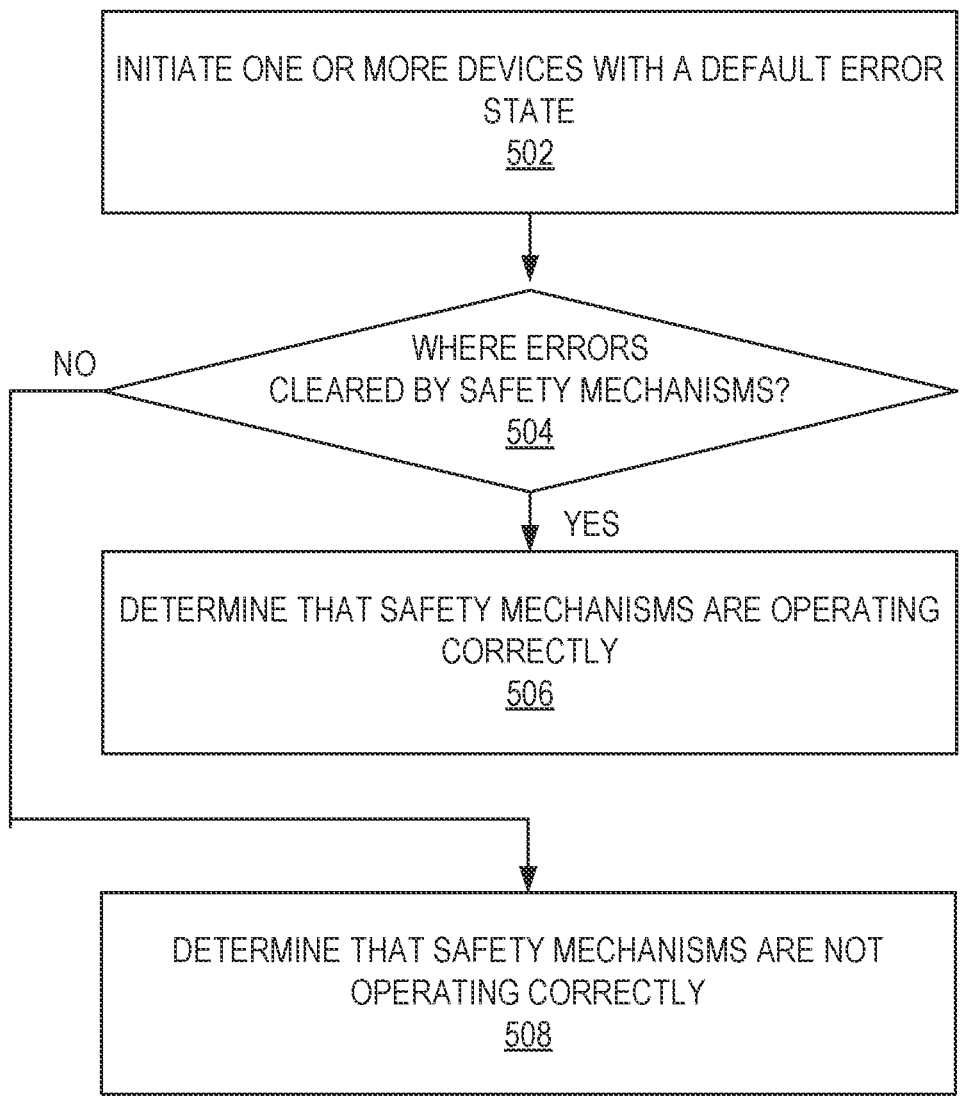
FIG. 5 is a flowchart showing a method for testing safety mechanisms implemented for achieving functional safety, according to some example embodiments.

FIG. 5 is a flowchart showing a method 500 for testing safety mechanisms implemented for achieving functional safety, according to some example embodiments. The method 500 may be embodied in computer readable instructions for execution by one or more processors such that the operations of the method 500 may be performed in part or in whole by the data scanning and correction system 106; accordingly, the method 500 is described below by way of example with reference to the data scanning and correction system 106. However, it shall be appreciated that at least some of the operations of the method 500 may be deployed on various other hardware and/or software configurations and the method 500 is not intended to be limited to the data scanning and correction system 106.

At operation 502, the safety mechanism testing component 210 initiates one or more devices with a default error state. The devices may be any of a variety of types of devices, such as storage devices 102, compute devices (e.g., filters, processors), and the like. The devices may be implemented with any of a variety of types of safety mechanisms to provide for functional safety of the devices. The safety mechanism testing component 210 initiates the one or more devices with a default error state at startup and/or reset.

At operation 504, the safety mechanism testing component 210 determines whether the errors were cleared by the safety mechanisms. If the safety mechanism testing component 210 determines that the errors were cleared by the safety mechanisms, at operation 506, the safety mechanism testing component 210 determines that the safety mechanisms are operation correctly. Alternatively, if the safety mechanism testing component 210 determines the that errors were not cleared by the safety mechanisms, at operation 508, the safety mechanism testing component 210 determines that the safety mechanisms are not operating correctly. In this type of situation, the safety mechanism testing component 210 may cause presentation of an alert message or notification. For example, the safety mechanism testing component 210 may cause a warning light to be activated in a vehicle.

Software Architecture

Figure 6:
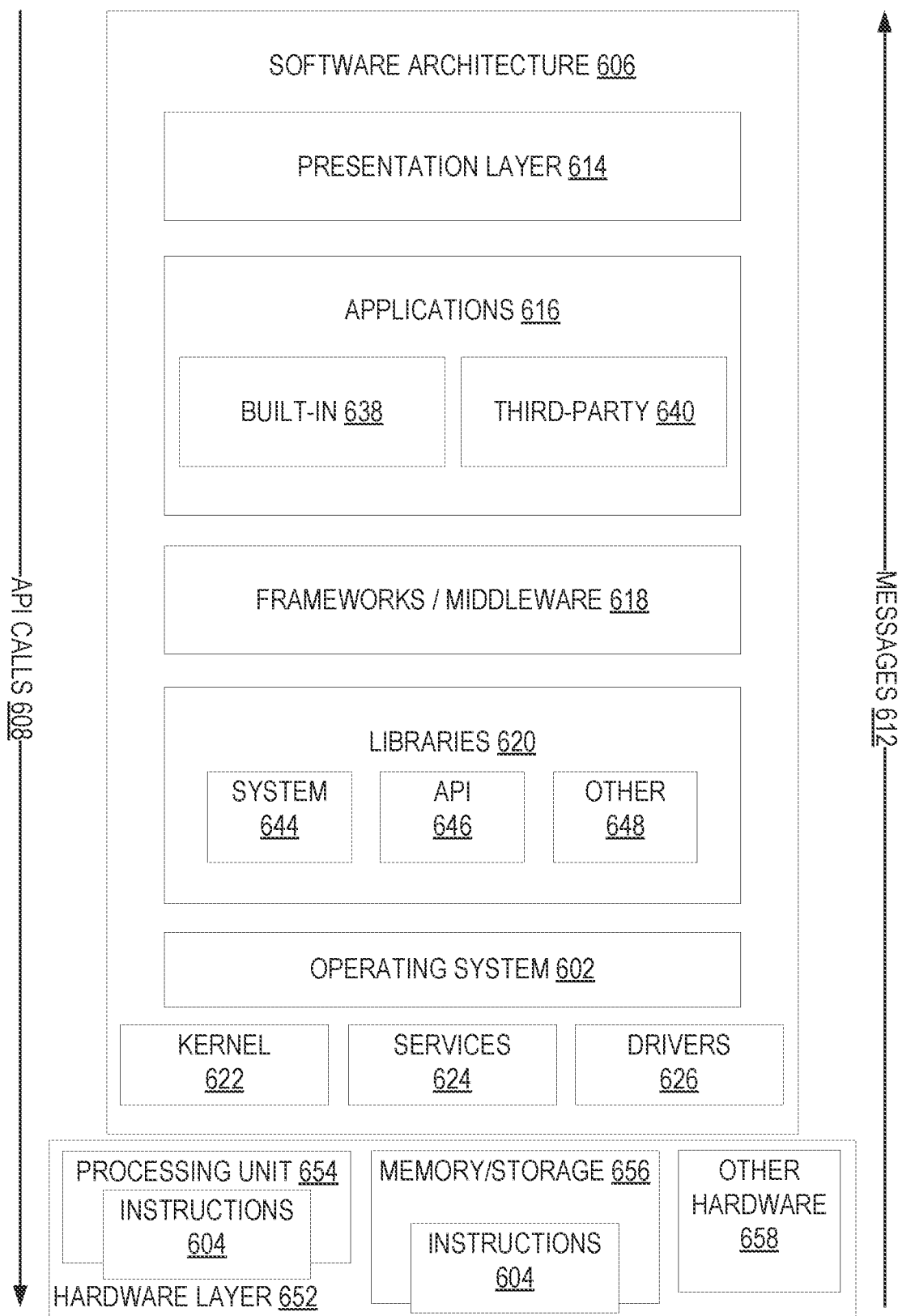
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality, such as the Open Systems Interconnection model (OSI model). For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
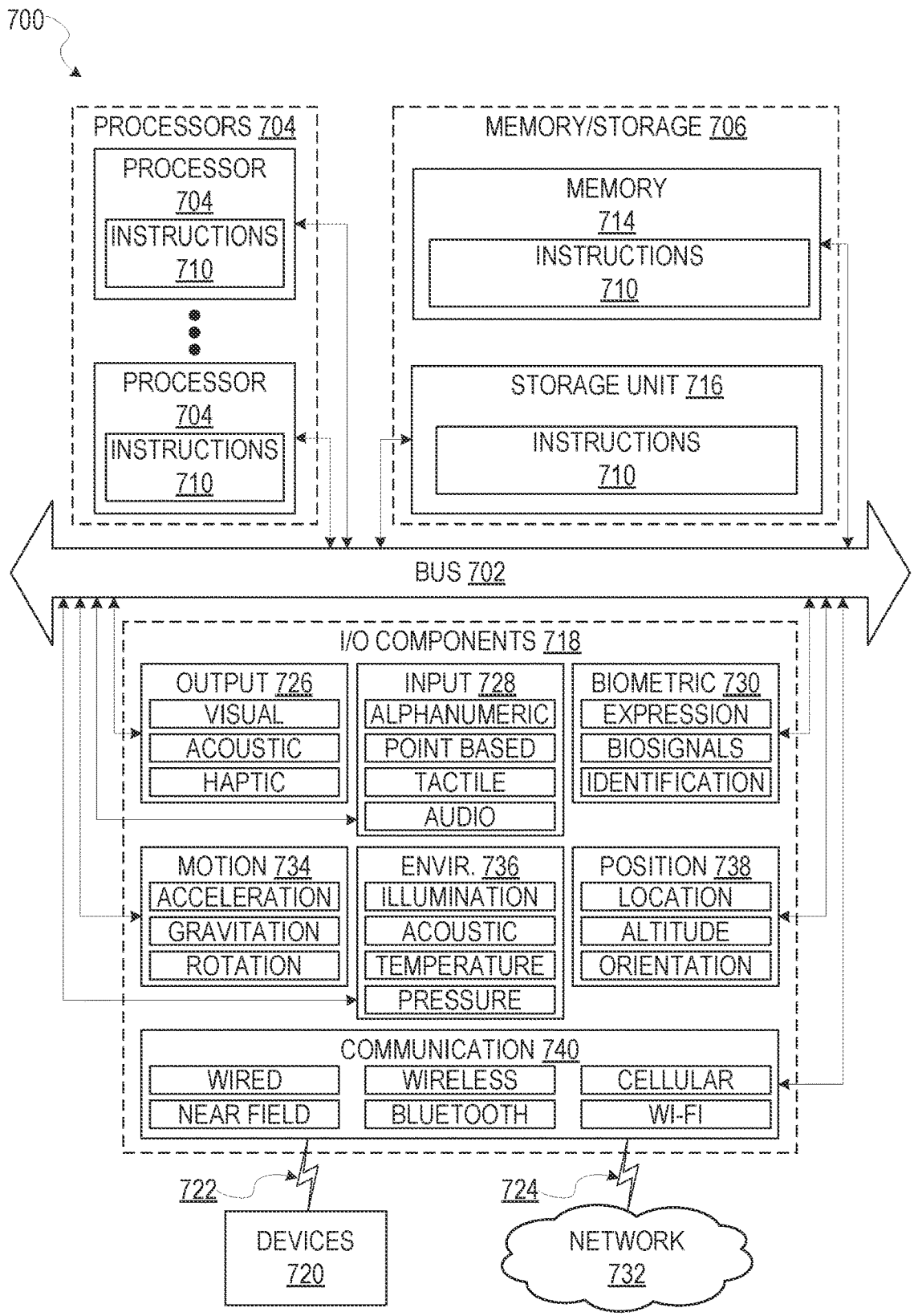
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method comprising:
    reading data from a first portion of a storage device, the storage device storing an error correction code associated with the data;
    determining, based on the error correction code, that there is an error in the data read from the first portion of the storage device; and
    in response to determining that there is the error in the data read from the first portion of the storage device:
        generating corrected data based on the data read from the first portion of the storage device and the error correction code; and
        writing the corrected data to the first portion of the storage device, the corrected data replacing the data that was read from the first portion of the storage device.

2. The method of claim 1, wherein the data is first data, the error correction code is a first error correction code, and the corrected data is first corrected data, the method further comprising:
    reading second data from a second portion of the storage device, the storage device storing a second error correction code associated with the second data; and
    determining, based on the second error correction code, that there are no errors in the second data read from the second portion of the storage device.

3. The method of claim 1, wherein the error correction code provides for a threshold number of bits of error correction.

4. The method of claim 3, wherein the error comprises a first number of bits in the data read from the first portion of the storage device, the first number being less than or equal to the threshold number.

5. The method of claim 4, wherein the data is first data and the corrected data is first corrected data, the method further comprising:
    after writing the first corrected data to the first portion of the storage device, subsequently reading second data from the first portion of the storage device;
    determining, based on the error correction code, that there is a second error in the second data that was subsequently read from the first portion of the storage device, the second error comprising a second number of bits in the second data, the second number of bits being less than or equal to the threshold number and a sum of the first number and the second number exceeds the threshold number; and
    in response to determining that there is the second error in the second data that was subsequently read from the first portion of the storage device:
        generating subsequent corrected data based on the second data that was subsequently read from the first portion of the storage device and the error correction code; and
        writing the subsequent corrected data to the first portion of the storage device.

6. The method of claim 1, further comprising:
    during service of a computing device that comprises the storage device, continuously reading data from a plurality of portions of the storage device and rewriting any select data determined to have a detected error with select corrected data generated using associated error correction codes.

7. The method of claim 1, wherein the data read from the first portion of the storage device includes a storage address that references the first portion of the storage device.

8. A system comprising:
    one or more computer processors; and
    one or more computer-readable mediums storing instructions that, when executed by the one or more computer processors, cause the system to perform operations comprising:
        reading data from a first portion of a storage device, the storage device storing an error correction code associated with the data;
        determining, based on the error correction code, that there is an error in the data read from the first portion of the storage device; and
        in response to determining that there is the error in the data read from the first portion of the storage device:
            generating corrected data based on the data read from the first portion of the storage device and the error correction code; and
            writing the corrected data to the first portion of the storage device, the corrected data replacing the data that was read from the first portion of the storage device.

9. The system of claim 8, wherein the data is first data, the error correction code is a first error correction code, and the corrected data is first corrected data, the operations further comprising:
    reading second data from a second portion of the storage device, the storage device storing a second error correction code associated with the second data; and determining, based on the second error correction code, that there are no errors in the second data read from the second portion of the storage device.

10. The system of claim 8, wherein the error correction code provides for a threshold number of bits of error correction.

11. The system of claim 10, wherein the error comprises a first number of bits in the data read from the first portion of the storage device, the first number being less than or equal to the threshold number.

12. The system of claim 11, wherein the data is first data and the corrected data is first corrected data, the operations further comprising:
 after writing the first corrected data to the first portion of the storage device, subsequently reading second data from the first portion of the storage device;
 determining, based on the error correction code, that there is a second error in the second data that was subsequently read from the first portion of the storage device, the second error comprising a second number of bits in the second data, the second number of bits being less than or equal to the threshold number and a sum of the first number and the second number exceeds the threshold number; and
 in response to determining that there is the second error in the second data that was subsequently read from the first portion of the storage device:
  generating subsequent corrected data based on the second data that was subsequently read from the first portion of the storage device and the error correction code; and
  writing the subsequent corrected data to the first portion of the storage device.

13. The system of claim 8, the operations further comprising:
 during service of a computing device that comprises the storage device, continuously reading data from a plurality of portions of the storage device and rewriting any select data determined to have a detected error with select corrected data generated using associated error correction codes.

14. The system of claim 8, wherein the data read from the first portion of the storage device includes a storage address that references the first portion of the storage device.

15. A non-transitory computer-readable medium storing instructions that, when executed by one or more computer processors of one or more computing devices, cause the one or more computing devices to perform operations comprising:
 reading data from a first portion of a storage device, the storage device storing an error correction code associated with the data;
 determining, based on the error correction code, that there is an error in the data read from the first portion of the storage device; and
 in response to determining that there is the error in the data read from the first portion of the storage device:
  generating corrected data based on the data read from the first portion of the storage device and the error correction code; and
  writing the corrected data to the first portion of the storage device, the corrected data replacing the data that was read from the first portion of the storage device.

16. The non-transitory computer-readable medium of claim 15, wherein the data is first data, the error correction code is a first error correction code, and the corrected data is first corrected data, the operations further comprising:
 reading second data from a second portion of the storage device, the storage device storing a second error correction code associated with the second data; and
 determining, based on the second error correction code, that there are no errors in the second data read from the second portion of the storage device.

17. The non-transitory computer-readable medium of claim 15, wherein the error correction code provides for a threshold number of bits of error correction.

18. The non-transitory computer-readable medium of claim 17, wherein the error comprises a first number of bits in the data read from the first portion of the storage device, the first number being less than or equal to the threshold number.

19. The non-transitory computer-readable medium of claim 18, wherein the data is first data and the corrected data is first corrected data, the operations further comprising:
 after writing the first corrected data to the first portion of the storage device, subsequently reading second data from the first portion of the storage device;
 determining, based on the error correction code, that there is a second error in the second data that was subsequently read from the first portion of the storage device, the second error comprising a second number of bits in the second data, the second number of bits being less than or equal to the threshold number and a sum of the first number and the second number exceeds the threshold number; and
 in response to determining that there is the second error in the second data that was subsequently read from the first portion of the storage device:
  generating subsequent corrected data based on the data that was subsequently read from the first portion of the storage device and the error correction code; and
  writing the subsequent corrected data to the first portion of the storage device.

20. The non-transitory computer-readable medium of claim 15, the operations further comprising:
 during service of a computing device that comprises the storage device, continuously reading data from a plurality of portions of the storage device and rewriting any select data determined to have a detected error with select corrected data generated using associated error correction codes.

21. The non-transitory computer-readable medium of claim 15, wherein the data read from the first portion of the storage device includes a storage address that references a second portion of the storage device.

* * * * *